United States Patent [19]
Abthoff et al.

[11] 3,948,229
[45] Apr. 6, 1976

[54] MANIFOLD STRUCTURE FOR A FOUR-CYCLE INTERNAL COMBUSTION ENGINE

[75] Inventors: Jörg Abthoff, Pluderhausen; Reinhard Kirsch, Stuttgart; Rolf Ohlendorf, Schnait; Franz Ruf, Stuttgart, all of Germany

[73] Assignee: Daimler-Benz Aktiengesellschaft, Germany

[22] Filed: Sept. 4, 1974

[21] Appl. No.: 502,942

[30] Foreign Application Priority Data
Sept. 6, 1973 Germany............................ 2344864

[52] U.S. Cl............. 123/52 M; 123/193 H; 60/305
[51] Int. Cl.² ........................................ F02M 35/10
[58] Field of Search............ 60/305, 304; 123/52 M, 123/52 MV, 52 MB, 193 H

[56] References Cited
UNITED STATES PATENTS

| | | |
|---|---|---|
| 3,500,805 | 3/1970 | Reisacher.................... 123/193 H X |
| 3,522,702 | 8/1970 | Grosseau .............................. 60/305 |
| 3,742,923 | 7/1973 | Obländer et al........... 123/52 MV X |

FOREIGN PATENTS OR APPLICATIONS

| | | |
|---|---|---|
| 1,195,483 | 6/1970 | United Kingdom................... 60/305 |

*Primary Examiner*—Charles J. Myhre
*Assistant Examiner*—William C. Anderson
*Attorney, Agent, or Firm*—Craig & Antonelli

[57] ABSTRACT

A four-cycle internal combustion engine with external ignition, which is equipped with an intake or suction manifold and with a separate forced air supply to the exhaust channels; to that end an air supply channel is cast-in adjacent one of the exhaust channels provided in a cast cylinder head, whereby the air supply channel is in communication with a slot extending along one suction pipe side in the longitudinal direction of the engine block; the slot is covered off on its open side by a flange of the intake or suction manifold and is operatively connected with the individual exhaust channels by way of cross bores provided in the cylinder head.

7 Claims, 3 Drawing Figures

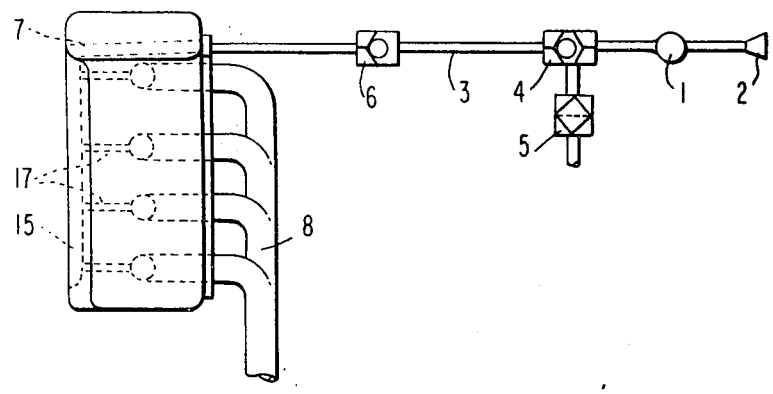
FIG.1
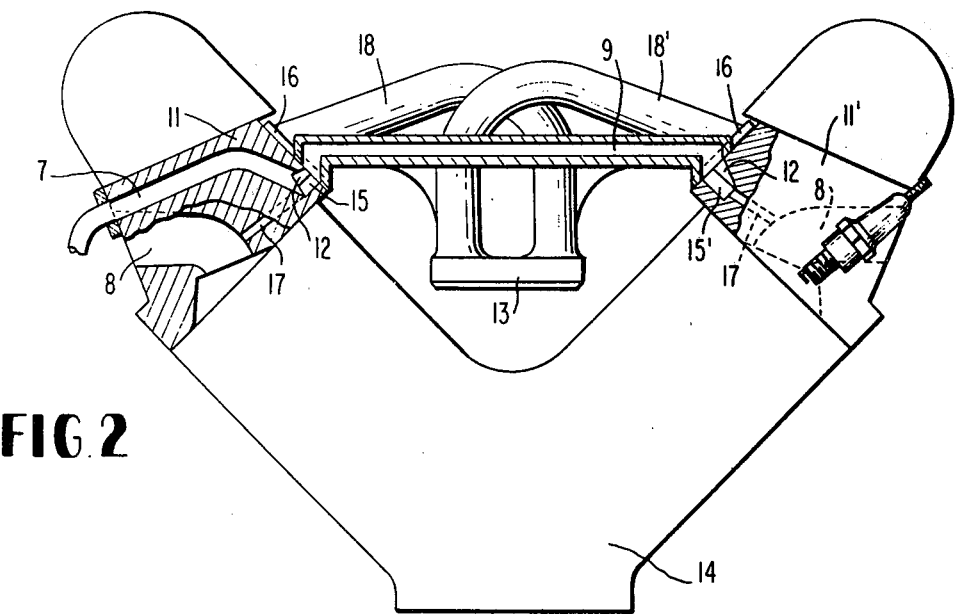
FIG.2
FIG.3
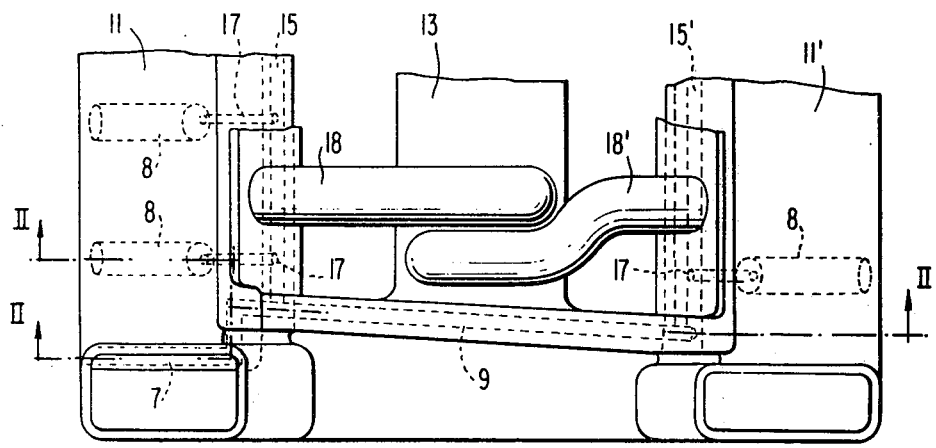

MANIFOLD STRUCTURE FOR A FOUR-CYCLE INTERNAL COMBUSTION ENGINE

The present invention relates to a four-cycle internal combustion engine with external or applied ignition, especially with a V-shaped cylinder block arrangement, with an intake or suction manifold arranged on the inside of the free V-space and with a separately provided forced air supply to the exhaust gas exhaust channels.

For improving the composition of the exhaust gases of such four-cycle internal combustion engines, it has been proposed to supply air forcibly to the exhaust gas directly after it leaves the cylinder. In engines with a V-shaped cylinder arrangement, it has been attempted initially to arrange the line serving the forced air supply between the intake or suction manifold arranged in the V-space and the engine housing. However, it has been discovered that a line arranged in this manner is heated very strongly by exhaust gas backfirings and by a lacking possibility to supply cooling air. This, however, should be avoided in order that the rate of air flow is not deteriorated. The arrangement of an air supply line as channel cast or bored into the cylinder head had to be abandoned because for such a construction no sufficient space was available in view of the otherwise necessary peculiarities of the cylinder head.

It is the aim of the present invention to eliminate the described shortcomings and to still find a space notwithstanding all opposing difficulties, which enables the air supply to the exhaust channels, which is not exposed to the dangers of a heat-up by its surroundings to the described extent and which additionally can be cooled.

The underlying problems are solved according to the present invention in that an air supply channel is cast-in adjacent an exhaust channel disposed in a cast cylinder head, which air supply channel is in communication with a slot extending on the suction pipe side in the longitudinal direction of the engine block, whereby the slot is covered off on its open side by the flange of the intake or suction manifold and, on the other hand, is connected with the individual exhaust channels by way of cross bores provided in the cylinder block. A bore may thereby be provided in the intake or suction manifold which connects the air slot in the one cylinder head with a slot provided in a similar manner in the second cylinder head. It is possible by this connecting line between the two cylinder heads to economize the cast-in air supply channel on one side in connection with the other cylinder head and to supply nonetheless the two air slots to a sufficient extent with the air to be supplied to the exhaust channels. Additionally, no particular expenditures result therefrom by reason of the fact that this bore can still be accommodated in the intake or suction manifold, particularly as the seal thereat as also at the air slots is simple because the flanges provided for the fastening of the intake or suction manifold at the cylinder heads may also be utilized for the seal of the air slots and of the inlet apertures of the bore.

It became possible by the present invention to carry out the forced air supply under limited availability of space with acceptable changes. Considerable simplifications of the overall installation resulted thereby as compared to the known constructions. Thus, for example, the engine space is kept free of additional lines with mountings and insulation. As a result thereof, space difficulties in the engine space of the vehicle were obviated thereby. Also, many sealing problems no longer occur because many pipe connections are eliminated. Furthermore, the construction according to the present invention can be made in a less expensive manner because the slot can be readily milled-in without special expenditures, and the casting-in of the air supply channel in only one of the cylinder heads entails no particular difficulties. Moreover, the cross bores provided in the cylinder head can be easily included in the operational steps of the assembly line. Additionally, as a further advantage, the air slot lies on the cold side of the engine and can be readily included in the engine cooling system. Finally, the fully integrated type of construction of the air supply can be used in all types of engine construction in which for structural reasons a slot is possible and the slot can be covered off by a correspondingly constructed intake or manifold. For that reason, in particular the type of construction according to the present invention is of very special importance with V-engines by reason of the space-savings achieved thereby.

Accordingly, it is an object of the present invention to provide a four-cycle internal combustion engine which avoids by simple means the aforementioned shortcomings and drawbacks encountered in the prior art.

Another object of the present invention resides in a four-cycle internal combustion engine with forced air supply to the exhaust channels which avoids excessive heating of any of the lines or ducts, yet precludes a deterioration of the rate of air flow.

Still a further object of the present invention resides in a four-cycle engine of the type described above which makes possible the air supply to the exhaust channels, notwithstanding the restricted conditions existing in the engine space, and without the danger of an undue heating-up thereof by its surroundings.

A still further object of the present invention resides in a four-cycle internal combustion engine with forced air supply to the exhaust channels which is relatively inexpensive in construction, avoids sealing problems and eliminates excessively costly changes in the engine design and manufacture.

Another object of the present invention resides in a four-cycle internal combustion engine with forced air supply to the exhaust channels which permits a simplification of the over-all installation by obviating the need for additional lines together with their mountings and seals and by eliminating the normal insulating problems connected therewith.

A still further object of the present invention resides in a four-cycle internal combustion engine of the type described above which permits a forced air supply to the exhaust channels that can be readily accomplished by scheduling appropriate manipulations and machining operations along the assembly lines that can be readily incorporated into existing assembly lines without disturbing the established over-all assembly line operation.

These and further objects, features, and advantages of the present invention will become more apparent from the following description when taken in connection with the accompanying drawing which shows, for purposes of illustration only, one embodiment in accordance with the present invention, and wherein:

FIG. 1 is a schematic view of the air supply installation at a cylinder head in accordance with the present invention;

FIG. 2 is a front elevational view of a V-type engine with an air supply installation according to the present invention, partly in cross section taken along lines II—II of FIG. 3, whereby cross-sectional planes disposed one behind the other have been displaced into the plane of the drawing for the sake of simplicity; and FIG. 3 is a partial plan view on the engine block of FIG. 2.

Referring now to the drawing wherein like reference numerals are used throughout the various views to designate like parts, and more particularly to FIG. 1, air is sucked-in by an air pump 1 through a suction opening 2 and by way of a line 3 and is conducted by way of an excess pressure valve 4 of conventional construction with a damping filter 5, by way of which excess air is released into the atmosphere, and by way of a check valve 6 to an air supply line 7. The cross sections II-II indicated in FIG. 3, which extend, on the one hand, through the air supply channel 7 and, on the other, through the exhaust channel 8 and additionally through the bore 9 serving as connecting line, are displaced in FIG. 2 into the plane of the drawing for the sake of simplicity. It thus follows from FIGS. 2 and 3 that an air supply channel 7 is cast into the cylinder head 11 adjacent the first exhaust channel 8 disposed in a cast cylinder head 11. This air supply channel 7 is in communication by way of a recess 12 (FIG. 2) with a slot 15 extending on the side of an intake or suction manifold member 13 in the longitudinal direction of the engine block 14. This slot 15 is covered off on its open side by the flange 16 of the intake or suction manifold member 13. As to the rest, the slot 15 is connected with the individual exhaust channels 8 by way of cross bores 17 provided in the cylinder head 11. A bore 9 is provided in the intake suction or manifold member 13 fastened to the two cylinder heads 11 by means of the flanges 16, which bore 9 in cooperation with the recesses 12 connects with each other the air supply channel 7 and the slots 15 and 15'. As a result thereof, the air supplied through the air supply channel 7 is fed both to the slot 15 on the right side of the engine (cylinder head 11) as also to the slot 15' on the left side of the engine (cylinder head 11') on which no air supply channel 7 is provided. The bore 9 serving as connecting line could be provided in the existing intake suction or manifold member 13 having the suction pipes 18 and 18' without special changes of the casting.

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A four-cycle internal combustion engine with external ignition, with suction manifold means and with a separately provided forced air supply to exchaust channels of the engine, characterized in that an air supply channel means is cast-in adjacent one of the exhaust channels provided in a cast cylinder head means, said air supply channel means being in communication with a slot means extending on the suction manifold means side of the engine in the longitudinal direction of the engine block, said slot means being covered off on its open side by a flange means of the suction manifold means and being operatively connected with the individual exhaust channels by way of cross bores provided in the cylinder head means.

2. A four-cycle internal combustion engine according to claim 1, characterized in that the engine block has a V-shaped arrangement with the intake manifold means arranged inside the free V-space.

3. A four-cycle internal combustion engine with external ignition, with intake manifold means and with a separately provided forced-air supply to the exhaust channels of the engine, characterized in that an air supply channel means is cast-in adjacent one of the exhaust channels provided in a cast cylinder head means, said air supply channel means being in communication with a slot means extending on the intake manifold side in the longitudinal direction of the engine block, said slot means being covered off on its open side by a flange means of the intake manifold means and being operatively connected with the individual exhaust channels by way of cross bores provided in the cylinder head means, and in that a bore is provided in the intake manifold means which connects the slot means in one cylinder head means with a slot means provided in a substantially similar manner in a second cylinder head means.

4. A four-cycle internal combustion engine with external ignition, with an engine block, intake manifold means and with a separately provided force air supply to the exhaust channels of the engine, characterized in that an air supply channel means is cast-in adjacent one of the exhaust channels provided in a cast cylinder head means, said air supply channel means being in communication with a slot means extending on the intake manifold side in the longitudinal direction of the engine block, said slot means being covered off on its open side by a flange of the intake manifold means and being operatively connected with the individual exhaust channels by way of cross bores provided in the cylinder head means, the engine block has a V-shaped arrangement with the intake manifold means arranged inside the free V-space, and in that a bore is provided in the intake manifold means which connects the slot means in one cylinder head means with a slot means provided in a substantially similar manner in a second cylinder head means of the V-shaped arrangement of the engine block.

5. A four-cycle internal combustion engine which includes an engine block, cast cylinder head means mounted on the engine block, an intake manifold means mounted on the engine, individual exhaust channels provided in the cylinder head means, air supply means for supplying air to the individual exhaust channels in the cylinder head means, characterized in that an air supply channel means is cast-in adjacent one of the exhaust channels provided in the cast cylinder head means, a slot means is provided in the cast cylinder head means for directing air from the air supply channel means to the individual exhaust channels, said slot means is provided on the side of the engine at which the intake manifold means is mounted and extends in the longitudinal direction of the cylinder head means, means are provided for communicating said slot means with said air supply channel means, means in the cylinder head means for operatively connecting the slot means with the individual exhaust channels, and in that the open side of the slot means is covered by a flange means of the intake manifold means.

6. A four-cycle internal combustion engine according to claim 5, characterized in that the engine block is V-shaped with two cylinder head means, each of said cylinder head means is provided with a slot means on the side of the engine at which the intake manifold is mounted, and means for communicating the slot means in one of the cylinder head means with the slot means in the other of the cylinder head means.

7. A four-cycle internal combustion engine according to claim 6, wherein said means for communicating the slot means with each other is disposed in said intake manifold means.

* * * * *